ROTARY MACHINE

Original Filed Feb. 24, 1965 7 Sheets-Sheet 1

WALTER K. JEKAT
TADEUSZ A. TOKARCZYK
INVENTORS

BY Daniel H. Bobis
Atty

ROTARY MACHINE

Original Filed Feb. 24, 1965 7 Sheets-Sheet 2

WALTER K. JEKAT
TADEUSZ A. TOKARCZYK
INVENTORS

BY Daniel H. Bobis
Atty

ROTARY MACHINE

Original Filed Feb. 24, 1965 7 Sheets-Sheet 3

WALTER K. JEKAT
TADEUSZ A. TOKARCZYK
INVENTORS

BY Daniel H. Bobis
Atty

ROTARY MACHINE

Original Filed Feb. 24, 1965 7 Sheets-Sheet 4

WALTER K. JEKAT
TADEUSZ A. TOKARCZYK
INVENTORS

BY Daniel H. Bobis
Atty

WALTER K. JEKAT
TADEUSZ A. TOKARCZYK
INVENTORS

BY Daniel H. Bobis
Atty

ROTARY MACHINE

Original Filed Feb. 24, 1965 7 Sheets-Sheet 6

WALTER K. JEKAT
TADEUSZ A. TOKARCZYK
INVENTORS

BY Daniel H. Bobis
Atty

WALTER K. JEKAT
TADEUSZ A. TOKARCZYK
INVENTORS

BY Daniel H. Bobis
Atty

United States Patent Office

Re. 26,306
Reissued Nov. 21, 1967

26,306
ROTARY MACHINE

Walter K. Jekat, Upper Montclair, and Tadeusz A. Tokarczyk, Passaic, N.J., assignors to Worthington Corporation, Harrison, N.J., a corporation of Delaware Original No. 3,279,384, dated Oct. 18, 1966, Ser. No. 434,774, Feb. 24, 1965. Application for reissue Dec. 14, 1966, Ser. No. 604,524
27 Claims. (Cl. 103—87)

Matter enclosed in heavy brackets [ ] appears in the original patent but forms no part of this reissue specification; matter printed in italics indicates the additions made by reissue.

This invention relates to a rotary machine and more particularly to a turbine driven pump designed for use in an installation requiring simplicity of components and reliability in operation.

While many types of pumps or rotary machines have heretofore been devised for performing such functions they are undesirable from many standpoints, such as, size, complexity of design and cost of manufacture.

The present invention comprehends a turbine driven pump wherein the rotary of the turbine is preferably mounted on the impeller of the pump. By directing the discharge of both the turbine and pump into a substantially axially disposed outlet an ejector effect is created which enhances the efficiency of the unit.

The two fluid streams intermix and for maximum efficiency turbine discharge is preferably in an outward [radial] direction and the pump impeller discharge is at some angle to it and in the direction of shaft rotation.

The velocity of the liquid leaving the turbine is higher than that of the pump impeller and creates an ejector effect. The kinetic energy of the turbine which otherwise would go to waste is being utilized to improve the efficiency of the unit.

Further in accordance with the invention provisions are made for including stationary axle hydrostatic type bearings which provide for inexpensive and simple pressure pocket construction in form of milled flats on the axle. A simple bearing bushing of a hydrodynamic type is preferable used with the additional advantage of a fully floating rotor in a stationary or slow running speed condition. The bearing design is such that it allows the impeller pressure balance slots [holes] to be used for the bearing discharge passages thus further simplifying construction.

Further in accordance with the invention there is provided a special diffusion velocity schedule which allows turbine inlet passage to intersect the combined turbine and pump discharge without high dynamic-head losses. The flow velocity is decreased progressively to a low value so that the liquid can pass around the obstacle formed by the inlet passage and then uniform acceleration is introduced to meet the outlet flange size requirements.

The above mentioned rotor and diffusion passage design, use of the central cavity for working fluid supply and internal outlet passages along with provision of axle type bearing design allows the unit to be built into a single cast body. Provisions may also be made for the inclusion within the pump inner chamber of a bearing lubricating cleaning device in the form of a cyclone.

Further in accordance with the invention, complete passage symmetry is achieved by providing a dummy inlet opposite to the turbine inlet flange.

The dummy inlet can be utilized as a clean water pocket for cyclone cleaning apparatus supply, to avoid high dirt concentration should it occur during the start up. In this arrangement, the pump inner chamber acts as a settling tank, during the periods of idleness.

The above mentioned rotor and impeller construction, high hydrostatic bearing stiffness and symmetry of internal passages permits reduction of the distance between the bearings to preclude the development of bearing whirl or shaft critical speed.

Additionally without sacrificing any of the foregoing attributes the internal components can be fitted into different type single cast body should a specific pipe arrangement require such a change. The radial forces on the bearings are reduced to a minimum by incorporation of the internal components in a double volute casing.

Also within the scope of this invention is the provision that the liquid lubricated bearing may be replaced by presealed ball bearings which are shown as enclosed in a cartridge which also contains a mechanical seal. The water lubricated bearing supply passage may be used as clean liquid supply for the mechanical seal.

Also within the teachings of this invention is the provision utilizing a standard rotating shaft bearing arrangement where this type of construction is considered more suitable for certain operating conditions.

Further in accordance with the invention, an external bearing lubricating supply pipe may be installed providing means for pump cleaning after along periods of idleness where dirt and debris sediments can be expected.

As will be understood by one skilled in the art, two different fluids may be used and particularly where mixing is desired. Or in a situation where the fluids may be separated after mixing by using for example, a cyclone centrifuge or where separation will occur in a settling tank. A gas and liquid combination is also possible; for example, provisions may be made for driving the turbine by steam where the steam will condense and mix with water. In such an installation the gas bubbles increase the liquid head in the vertical discharge of the pump.

Accordingly it is an object of this invention to provide an improved rotary machine having the above mentioned advantages.

It is a further object of the present invention to construct machine in a single cast body.

It is another object of this invention to provide a design which is compact and which achieves high operational efficiency at reduced cost.

Other objects and advantages of the invention including the basic design and the nature of the improvements thereon will appear from the following description taken in conjunction with the following drawings, in which.

The turbine driven pump illustrated and described herein is particularly designed for balalsting and deballasting aboard ship. It should be noted however, that the invention is not limited for applications of this type but that there are possible applications for the unit and particularly in fluid handling situations requiring compactness of design and a small number of components.

Figure 1:
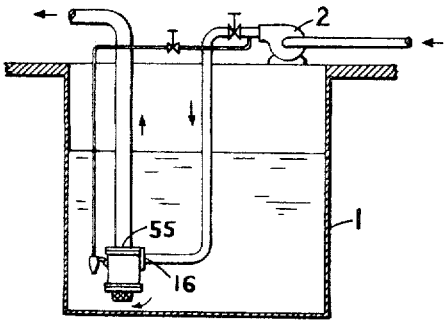
FIGURE 1 is a schematic view of a deballasting arrangement utilizing the present invention showing the conduits connected to the inlet for the turbine and the common outlet conduit connected to receive the combined discharge from the integral turbine and pumping impeller.
Figure 2:
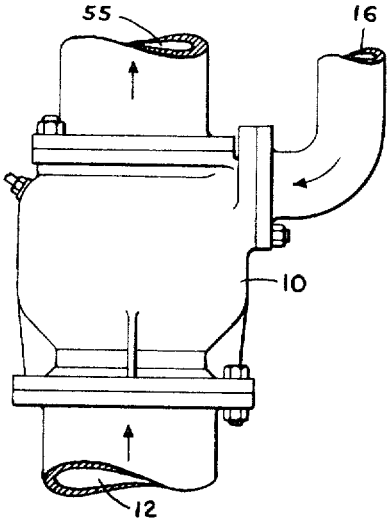
FIGURE 2 is a side view of the form of the present invention shown in FIGURE 3.
Figure 5:
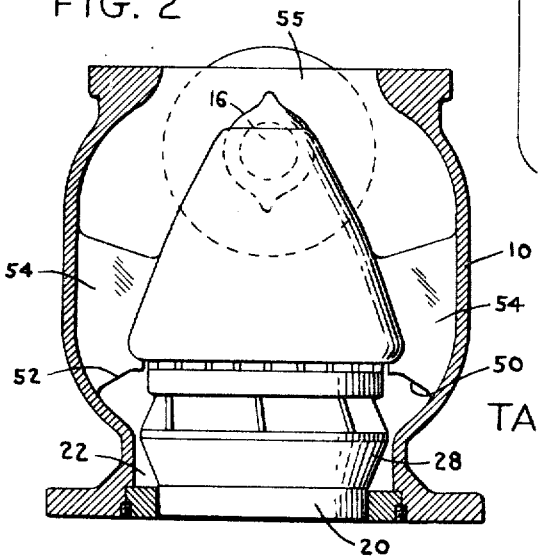
FIGURE 5 is a vertical section partly in side elevation of the form of the invention shown in FIGURE 3.

An application for the rotary machine or turbo-pump contemplated herein is shown diagrammatically in FIGURE 1 and takes the form of a deballasting installation aboard ship. A compartment containing liquid is designated 1 and is being deballasted by a turbo-pump driven by an auxiliary pump 2 the working fluid in this being water.

Figure 4:
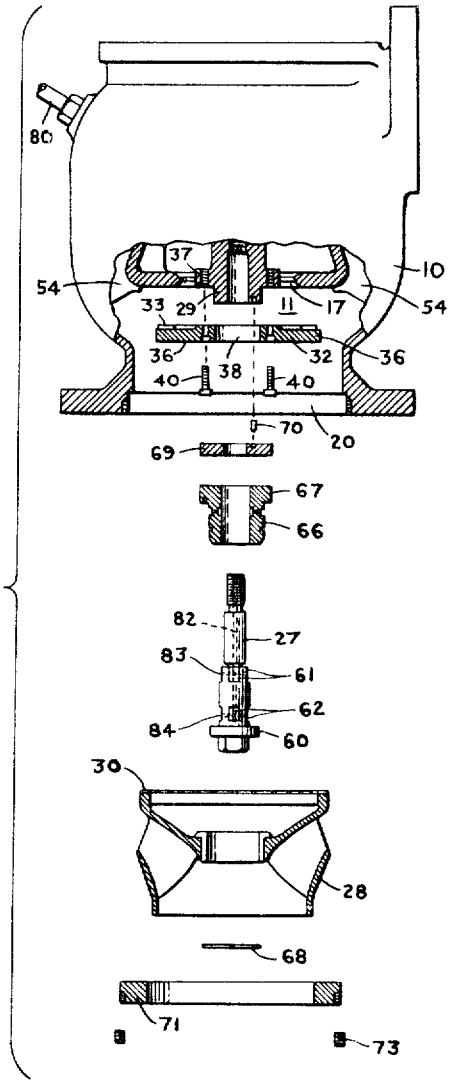
FIGURE 4 is an exploded view partially in vertical section showing the various elements of the form of the invention shown in FIGURE 3.

The turbo-pump being used in the application mentioned above is clearly shown in FIGURES 3 and 4 and comprises a casing 10 including a central cavity designated 11 which forms an inlet passage 12 at one end. Another inlet passage 16 for receiving working fluid, from pump 2, for motivating the unit is disposed at the upper end of the casing. The inlet passages [12 and 16] *16 and 12* are referred to as first and second inlet passages for convenience hereinafter. Inlet passage 16 communicates with inlet means 17 of a driving compartment 18 formed within the casing as will be described hereinafter.

Inlet passage 12 communicates with the inlet means 20 of a pumping chamber 22 also formed within the casing as will be described hereinafter.

A dummy passage 24 simulating the working fluid inlet 16 is formed in the casing 10 and opposite said working fluid to achieve the desired symmetrical disposition of the passages to preclude the possibility of radial inbalance.

Centrally disposed in the casing and extended thru the driving compartment 18 is a cavity 26 in which is [journaled an] *screw threadably mounted a non-rotatable,* axle type shaft 27 *in a threaded bore provided therefore in a shaft housing 29. A retaining pin 25 is preferably provided and extends as shown through a threaded bore provided therefor in the shaft housing 29 into contact with the axle type shaft 27 to retain the latter in operative position and positively prevent the rotation thereof during operation of the turbine-driven pump.* The shaft extends thru the driving compartment 18 and into the pumping chamber 22 and receives the impeller means 28.

A blade means or rotor 30 for driving the unit, as is shown in the preferred arrangement, is formed as an integral part of the impeller means. While this arrangement of rotor and impeller provides for optimum results it is within the scope of this invention to arrange or mount the rotor directly on the shaft so long as the short distances between the bearings are maintained.

Figure 3:
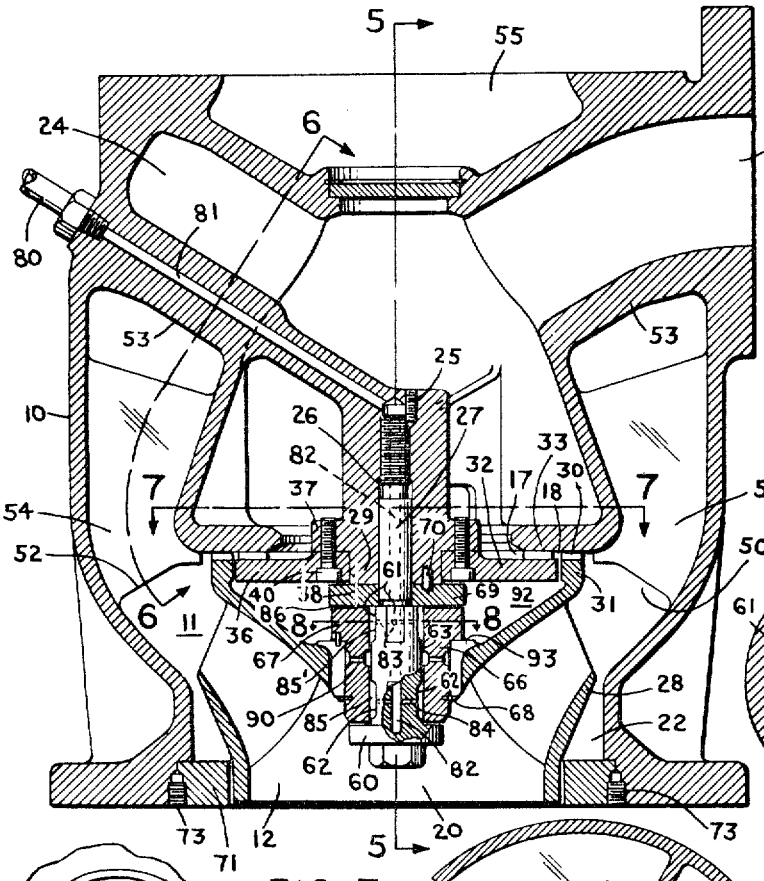
FIGURE 3 is a vertical section showing a preferred form of the present invention.
Figure 8:
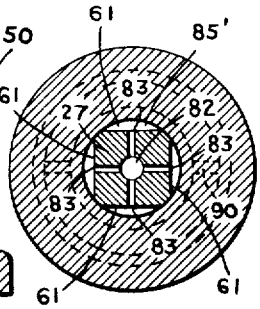
FIGURE 8 is a view taken on line 8—8 of FIGURE 3.
Figure 6:
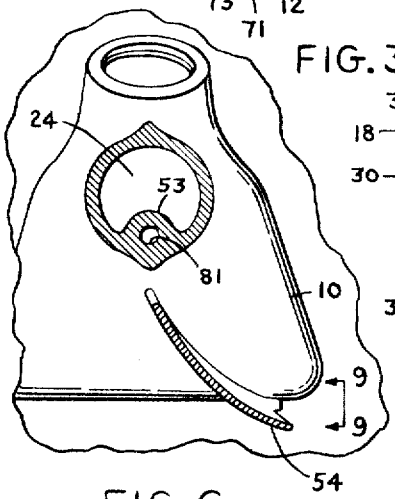
FIGURE 6 is a view taken on line 6—6 of FIGURE 3.
Figure 7:
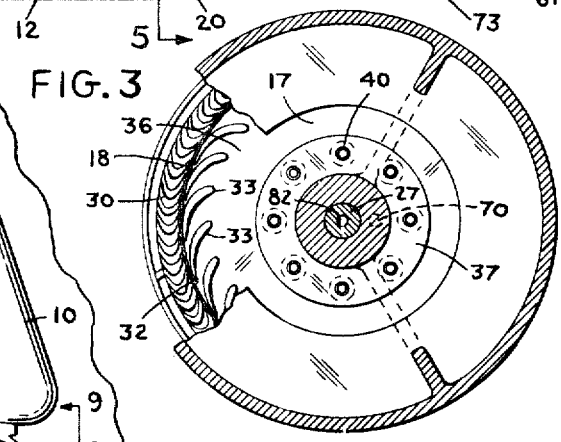
FIGURE 7 is a cross-section taken on line 7—7, partially broken away to show the stationary nozzles and turbine buckets of the form of the invention shown in FIGURE 3.
Figure 9:
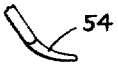
FIGURE 9 is a fragmentary view of the portion of the inlet edge of the vanes showing the turning element for the discharge fluid from turbine.

More particularly in the embodiment shown in FIGURE 3 the blade means 30 is formed on the inner U-shaped face 31 of the impeller means and is disposed in spaced relationship with a nozzle member 32. The nozzle member takes the form of a circular plate 36 having vanes 33 mounted thereon and includes an opening 38 to permit the shaft housing 29 to pass therethru. The nozzle plate is fixed to a flange 37 formed in the interior of casing 10 by bolts or the like designated 40.

It is obvious that different type vane configurations 33 for plate 36 can be provided to realize different type output capacities for the pump. Additionally, a partial admission type nozzle can be used if desired all within the teachings of the invention.

The turbine discharges the working fluid in a direction which is substantially normal to the shaft and into outlet passage 50. This would be termed an outward radial discharge and it is at a higher velocity than the pump impeller discharge which also discharges into the outlet passage 50 at another direction when compared to blade means discharge direction and in the direction shaft rotation.

To reduce the effects on flow that the different directions of discharge would have a diffuser means 52 is incorporated into the unit and blades 54 of the diffuser turn or blend the turbine discharge so that it follows the pumping means discharge.

Figure 13:
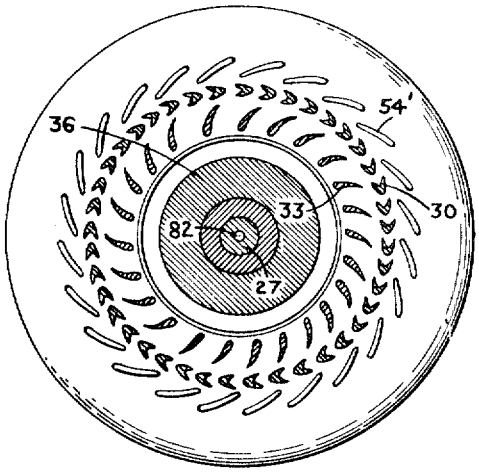
FIGURE 13 is a cross-section taken on line 13—13 of FIGURE 12.

In this fashion an ejector effect is created which increases the efficiency of the unit. More particularly the velocity of the turbine is higher than that of the pump impeller and the kinetic energy of the turbine which would normally go to waste is utilized. The ejector vanes 54 may be formed as part of the diffuser or separate as is shown in FIGURE 13 wherein they are designated 54'.

The diffuser serves an additional purpose in the present arrangement as follows:

A gradual decrease in the fluid velocity is provided for in the diffuser and in the portion 53 thereof which passes around the inlet passage 16 and dummy openings 24 to allow fluid to pass around these obstacles with minimum of losses.

Increase in velocity is provided for in the outlet 55 after the obstacles mentioned above are passed in order to meet the outlet flange size requirements.

BEARING AND LUBRICATING ARRANGEMENT

[Shaft 27 includes a retaining pin 25 at the upper end which is mounted in association therewith to maintain same in operable position. At the opposite end, shaft.] *Shaft* 27 includes a retaining member 60 and flats 61 and 62 formed on opposite sides of raised face 63 which serves as a mount for bearing bushing 66. Bushing 66 is held in operable position by retaining member 60 and thrust collar 69 which is held in position by pin 70.

Bearing bushing 66 *functions as an impeller mounting means and, to this effect,* includes a flange 67 which serves as a mount for impeller means 28. The impeller is locked on flange 67 by snapring 68. The usual wearing ring 71 is mounted in association with impeller means 28 by locking screws 73.

One form of lubrication means generally designated 80 may be utilized and comprises a plurality of passageways 81 in the casing which communicates with vertical passageway 82 in shaft 27, which in turn connects with horizontal passageways 83 and 84, in shaft 27, which discharge into chambers 85 and 85′ formed by the flats 61 and 62 and the inner wall of the bearing bushing. Lubricant in turn, flows through clearance 86 between thrust collar 69 and top of flange 67 and over raised face 63 into horizontal passageway 90 formed in bearing bushing 66 and into the pumping inlet means 20.

With the present arrangement and if the lubricant is the fluid being circulated by the unit, the working fluid supplied thereto can be bypassed from chamber 92 into opening 93 into the bearing on start-up to clear debris and trouble causing grit from the bearings.

In operation working fluid from pump 2 is passed to inlet 16 to cause blade means 30 to drive impeller means 28 to move fluid in compartment 1 into inlet 12 through pumping chamber 22 through outlet passage 50 and out opening 55.

Figure 12:
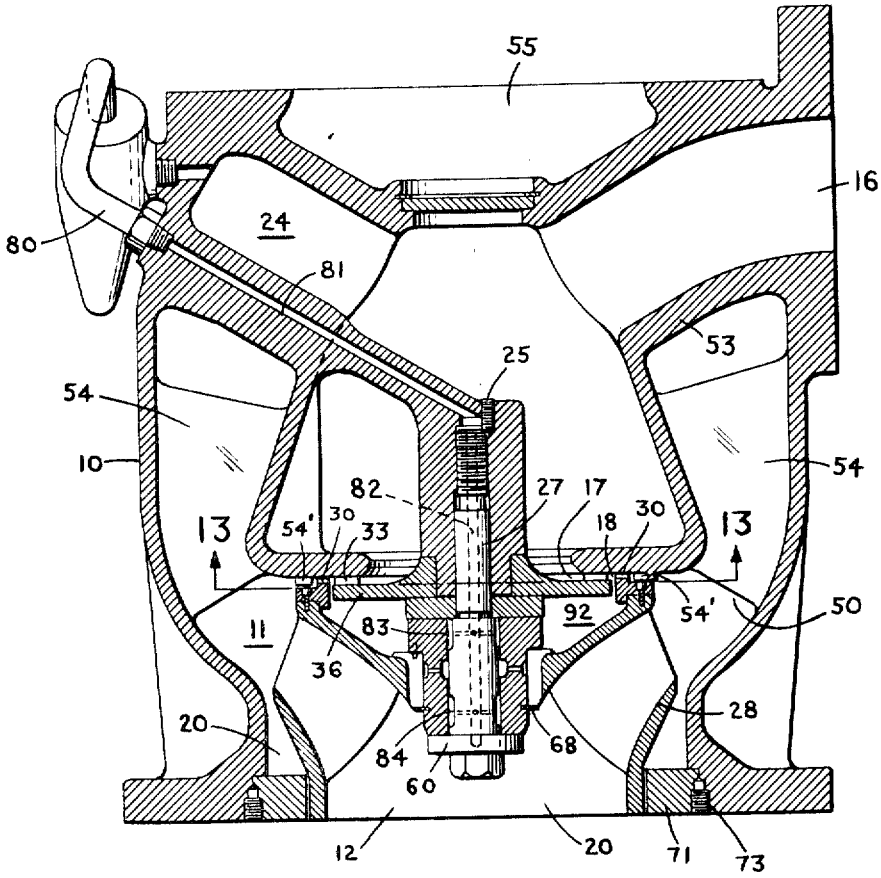
FIGURE 12 is a vertical section of another form of the invention showing independent ejector vanes.

The apparatus shown in FIGURES 12 and 13 is identical to the unit shown in FIGURES 1 to 9 of the drawings except that separate blades 54′ are provided for to turn the turbine discharge and the dummy passage 24 is used to provide clean water through lubricating arrangement decyclone 80.

As will be evident from FIGURE 12 on start up lubricant, usually water, is urged thru the passageways 81, 82, 83, 84 into the bearing surfaces to free same from any dirt or debris concentrations.

Figure 10:
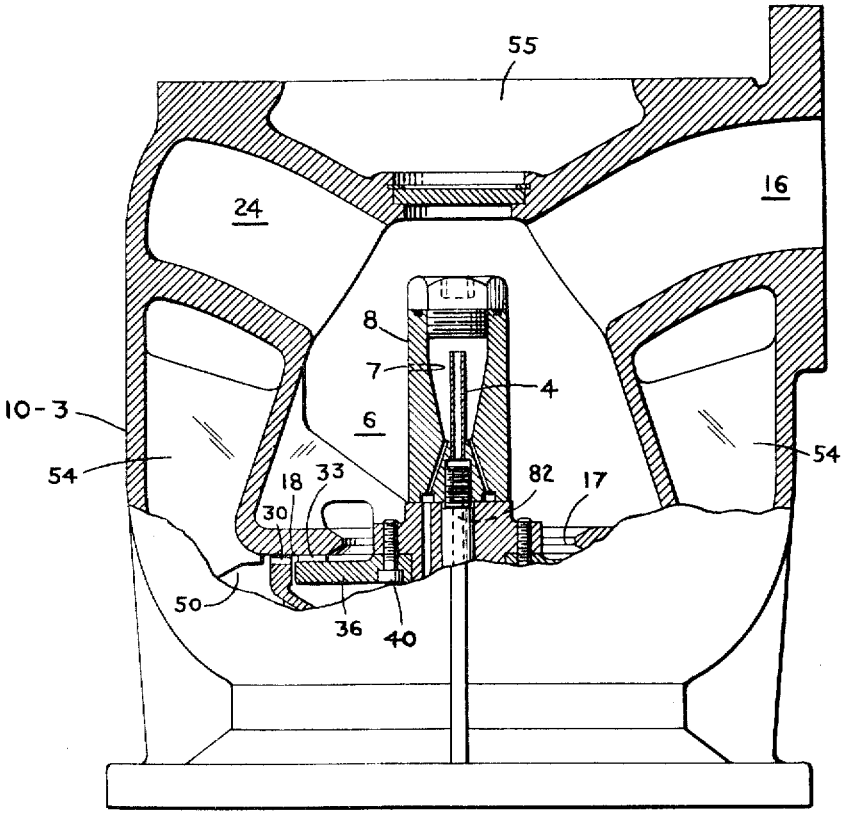
FIGURE 10 is a section of the form of the invention in FIGURE 3 showing a modified form of cyclone separating means.

A unit designated 10–3 also identical to the turbine driven pump 10 of FIGURES 1 to 9 is shown in FIGURE 10, and differs from the turbine pump 10 in the form of cyclone utilized for cleaning debris in this form the cyclone cleaning means 4 is connected to passageway 82 and housed in the pump inner chamber. Fluid from the inner chamber 6 enters opening 7 of the shaft extension 8 and flows thru the cyclone 4 down the passageways as was described in connection with the embodiment of FIGURE 3 into the bearing areas. Like parts in the embodiment of FIGURE 10 with those of FIGURE 3 are given the same reference characters.

Figure 11:
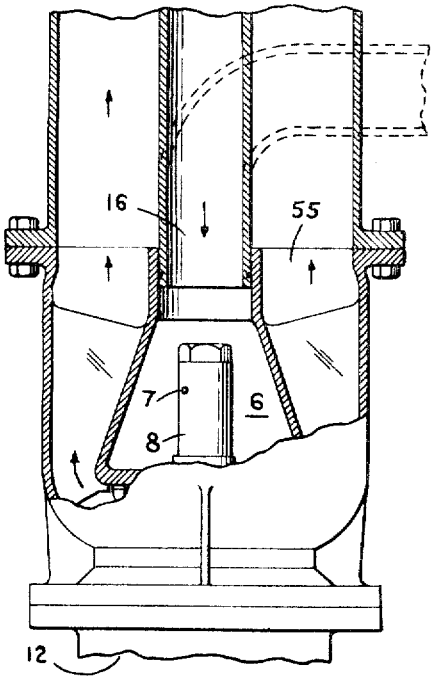
FIGURE 11 is a vertical section showing a vertically disposed delivery passage for driving fluid for the form of the invention shown in FIGURE 3 with the form of cyclone separating means shown in FIGURE 10.

The arrangement shown in FIGURE 11 is identical in all respects to the unit shown in FIGURE 10 except that a vertically disposed intake is shown for providing turbine driving fluid. In this particular arrangement the outlet 55 and inlet 16 are substantially parallel.

Figure 14:
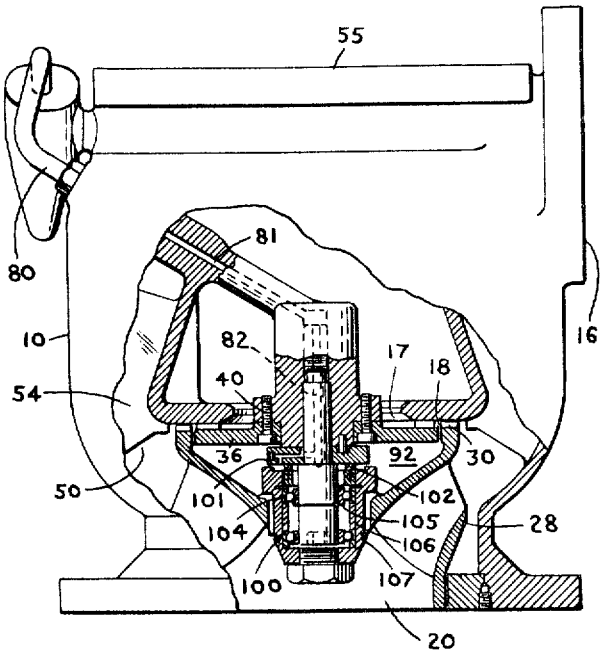
FIGURE 14 is a vertical section of still another modification of the present invention utilizing a mechanically sealed ball bearing for [rotatable] *rotatably* supporting the impeller hub with the form of cyclone separating means shown in FIGURE 10.
Figure 15:
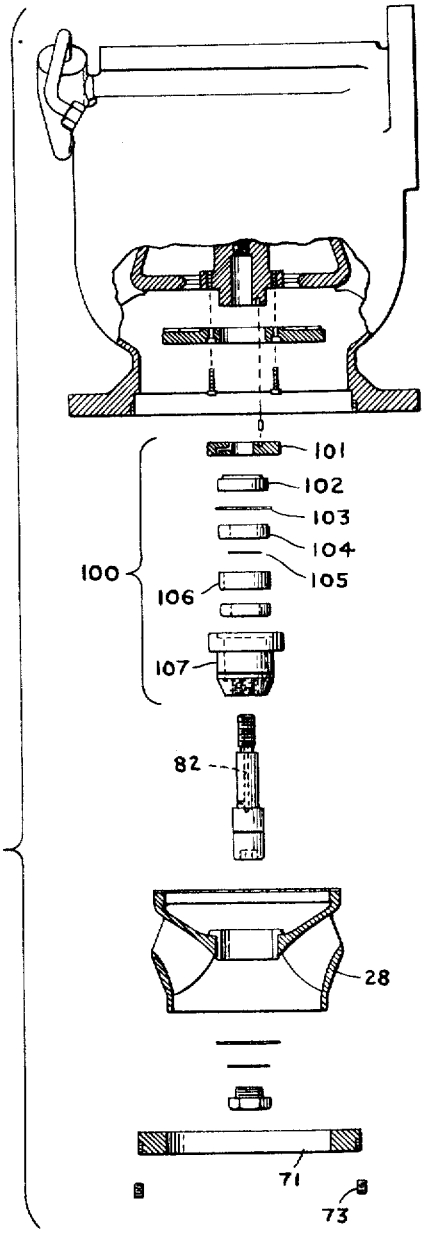
FIGURE 15 is an exploded view partially in vertical section showing the various elements of the form of the invention shown in FIGURE 14.

A further modification of bearing arrangement is shown in the embodiment shown in FIGURES 14 and 15. A ball bearing arrangement designated 100 is utilized in this form. Lubricant is supplied to the bearings of this arrangement thru a cyclone arrangement of the type shown in FIGURE 12. As is clear from FIGURE 14, the bearing arrangement comprises a thrust collar 101, a sealing ring 102, a snap ring 103, an upper bearing 104, a snap support ring 105, a spacing ring 106, a lower bearing all housed in bushing 107.

Figure 16:
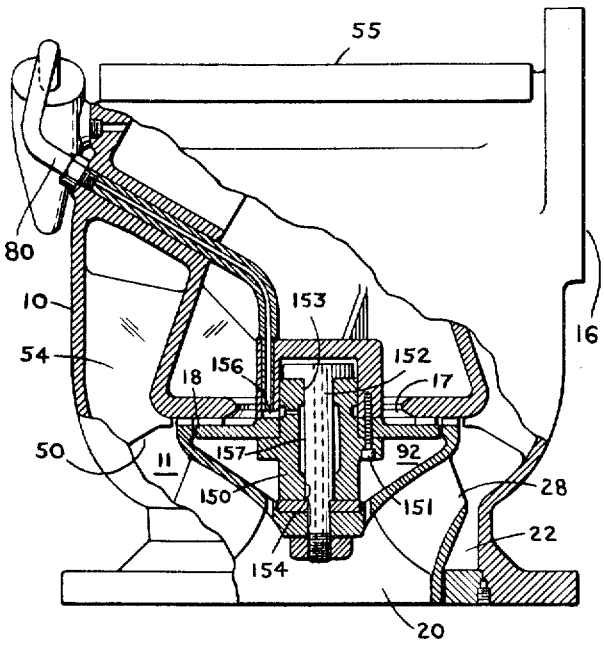
FIGURE 16 is a vertical section of another modification of the present invention wherein the impeller is mounted on an axle type shaft which rotates in a stationary bushing.
Figure 17:
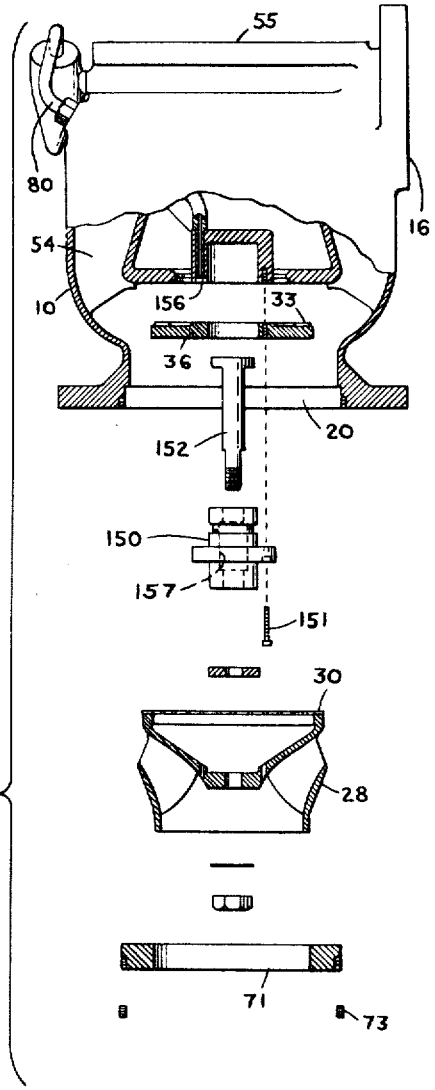
FIGURE 17 is an exploded view partially in vertical section showing the various elements of the form of the invention shown in FIGURE 16.

Further modification of bearing arrangement is shown in the embodiment of the invention depicted in FIGURES 16 and 17. A bushing 150 is rigidly mounted by pin or bolt 151 to a flange formed in the internal casing portion. Shaft 152 rotates on upper and lower faces 153 and 154 of bushing 150 *and, in this instance, functions as the impeller mounting means.* Lubrication is provided by cyclone 80 which operates in similar fashion to the cyclone of the embodiment of FIGURE 12. The cyclone rather than being connected to the top passage is connected to medial passage 156 which is in turn connected to chamber 157 formed between faces 153 and 154 of bushing 150.

As was the case hereinabove, like parts in the drawings have been given the same reference characters.

Figure 18:
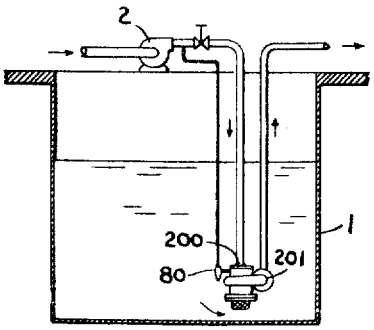
FIGURE 18 is a diagrammatic sketch of an alternative form of the present invention wherein the inlet for the turbine driving fluid is disposed in the longitudinal or axial line of the shaft.
Figure 19:
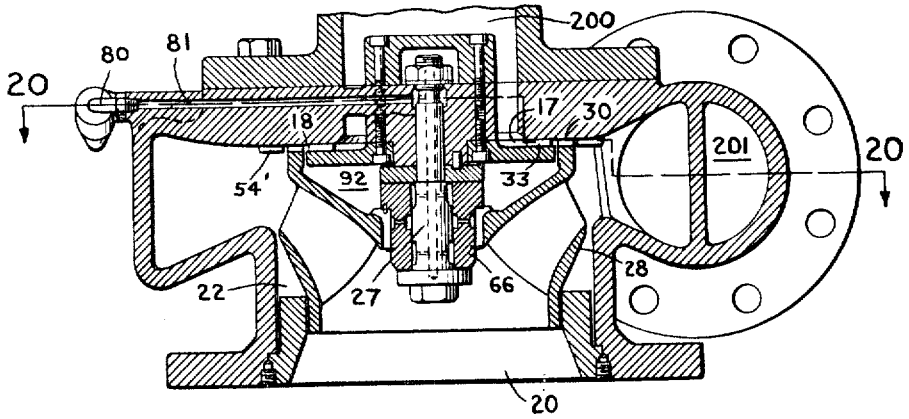
FIGURE 19 is a vertical section of the form of the invention shown in FIGURE 18.
Figure 20:
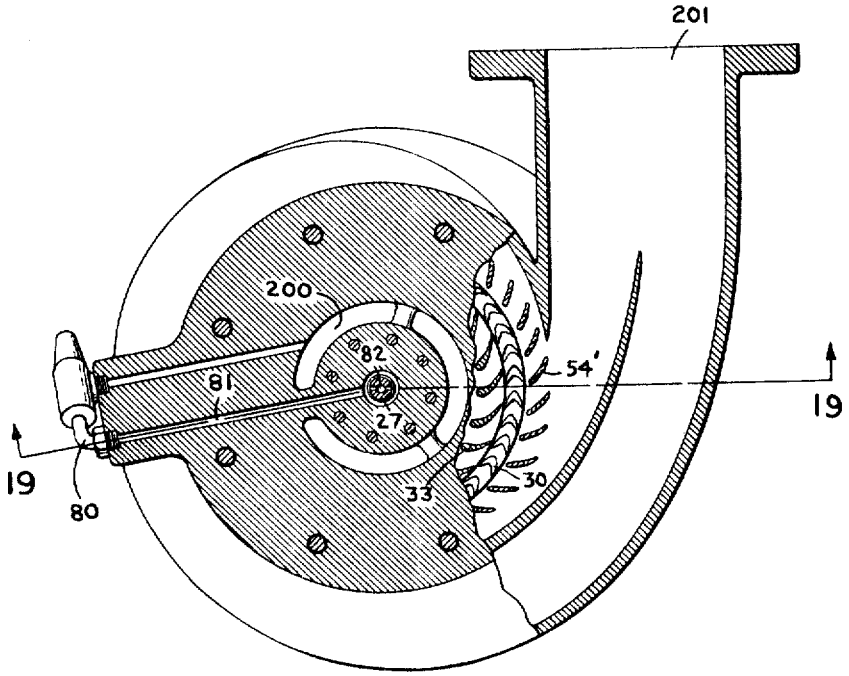
FIGURE 20 is a cross-section taken along line 20—20 in FIGURE 19.

FIGURES 18, 19 and 20 show a further modification of the present invention. More particularly a centrally disposed inlet 200 for receiving working fluid is shown with a volute type outlet 201. The remaining elements are similar to those of the unit shown in FIGURES 1 to 7 and have been given lie characters.

Although this invention has been described with reference to specific apparatus it will be appreciated that a wide variety of changes may be made within the ability of one skilled in the art without departing from the scope of this invention. For example, some of the components of the apparatus may be reversed, certain features of the invention may be used independently of others, and equivalents may be substituted for the apparatus, all within the spirit and scope of the invention as defined by the appended claims.

What is claimed is:

1. A rotary machine comprising a casing including a first and second inlet passage and an outlet passage, both of said inlet passages and said outlet passage being formed within said casing, means forming a pumping chamber being disposed in said casing, means forming a driving compartment being disposed in said casing, said pumping chamber and driving compartment each having inlet and outlet means, [a shaft] *impeller mounting means* rotatably mounted in said casing, an impeller means connected to said [shaft,] *impeller mounting means,* a blade means disposed in said driving compartment, means for connecting said blade means to said [shaft,] *impeller means so that* said blade means *is* operative to drive said impeller means, said first inlet passage connected to the inlet means of said driving compartment, said second inlet passage connected to the inlet means of said pumping chamber, the outlet means of said pumping chamber and said driving compartment being connected to said outlet passage, a source of working fluid being connected to said first inlet to cause said blade means to drive said impeller means to flow fluid into said inlet passage thru said pumping chamber and into said outlet passage, and a diffuser means in said outlet passage including means to decrease the velocity flow of fluid flowing in said outlet passage and then increase the velocity of said fluid whereby flow losses are reduced.

2. A rotary machine comprising a casing including a first and second inlet passage and an outlet passage, both of said inlet passages and said output passage being formed within said casing, said outlet passage being in proximate relation with one of said inlet passages, means forming a driving compartment being disposed in said casing, means forming a pumping chamber being disposed in said casing, said driving compartment and said pumping chamber each having inlet and outlet means, a shaft [rotatably] mounted in said casing, an impeller means [connected to] *mounted for rotation on* said shaft, a blade means disposed in the driving compartment, means for connecting said blade means to said [shaft,] *impeller means so that* said blade means *is* operative to drive said impeller means, said first inlet passage connected to the inlet means of said pumping chamber, the outlet means of said pumping chamber and said driving compartment being connected to said outlet passage, a source of working fluid being connected to said first inlet to cause said blade means to drive said impeller means to flow into said second inlet passage thru said pumping chamber and into said outlet passage, and a diffuser means in said outlet passage including means to decrease the velocity flow of fluid flowing in the portion of said outlet passage in proximate relation with one of said inlet passages and then increase the velocity of said fluid whereby flow losses are reduced.

3. The rotary machine claimed in claim 1 wherein the blade means is [connected to] *carried by* the impeller means.

4. The rotary machine claimed in claim 2 wherein the blade means is [connected to] *carried by* the impeller means.

5. A rotary machine comprising a casing including a first and second inlet passage and an outlet passage, both of said inlet passages and said outlet passage being formed within said caisng, means forming a pumping chamber being disposed in said casing, means forming a driving compartment being disposed in said casing, a shaft [rotatably] mounted in said casing and extending into said pumping chamber, an impeller means [disposed] *mounted for rotation* on the portion of said shaft extending [to] *into* said pumping chamber, a blade means disposed in said driving compartment, means for connecting said blade means to said [shaft,] *impeller means so that* said blade means *is* operative to drive said impeller means, said first inlet passages connected to said driving compartment, said second inlet passage connected to said pumping chamber, both said pumping chamber and said driving compartment being connected to said outlet passage, a source of working fluid being connected to said first inlet to cause said blade means to drive said impeller means to flow fluid into said second inlet through said pumping chamber and into said outlet passage in one direction of flow, and fluid from said driving compartment being passed to said outlet passage in another direction of flow, and means in said outlet passage to blend the fluid being flowed thereto from said pumping chamber, and said driving compartment into substantially one direction of flow.

6. A rotary machine comprising a casing including a first and second inlet passage and an outlet passage, both of said inlet passages and said outlet passage being formed within said casing, said outlet passage being in proximate relation with one of said inlet passages, means forming a driving compartment being disposed in said casing, means forming a pumping chamber being disposed in said casing, said driving compartment and said pumping chamber each having inlet and outlet means, a shaft [rotatably] mounted in said casing and extending into said pumping chamebr, an impeller means [disposed] *mounted for rotation on* the portion of said shaft extending into said pumping chamber, a blade means disposed in the driving compartment, means for connecting said blade means to said [shaft,] *impeller means so that* said blade means *is* operative to drive said impeller means, said first inlet passage connected to the inlet means of said driving compartment, said second inlet passage connected to the inlet means of said pumping chamber, the outlet means of said pumping chamber and said driving compartment being connected to said outlet passage, a source of working fluid being connected to said first inlet to cause said blade means to drive said impeller means to flow fluid into said second inlet thru said pumping chamber and then into said outlet passage in one direction of flow, and fluid from said driving compartment being passed to said outlet passage in another direction of flow, and means in said outlet passage to blend said fluid being flowed thereto from said impeller means and said driving compartment into substantially one direction of flow.

7. The rotary machine claimed in claim 5 wherein the blade means is formed on the impeller means.

8. The rotary machine claimed in claim 6 wherein the blade means is formed on the impeller means.

9. A rotary machine comprising a casing including a first and second inlet passage and an outlet passage, both of said inlet passages and said outlet passage being formed within said casing, means forming a pumping chamber being disposed in said casing, means forming a driving compartment being formed in said casing, a shaft [rotatably] mounted in said casing and extending into said pumping chamber, the portion of said shaft extending into said pumping chamber including means forming a bearing axle, a retaining means formed at the end of the portion of said shaft in said pumping chamber, a bearing member mounted *for rotation* on said bearing axle, a thrust member disposed about said shaft to cooperate with said retaining means to maintain said bearing member in operative position, an impeller means mounted on said bearing member, a blade means disposed in said driving compartment, means for connecting said blade means to said [shaft,] *impeller means so that* said blade means *is* operative to drive said impeller means, said first inlet passage connected to said driving compartment, said second inlet passage connected to said pumping chamber, both said pumping chamber and said driving compartment being connected to said outlet passage, a source of working fluid being connected to said first inlet to cause said blade means to drive said impeller to flow into said second inlet thru said pumping chamber and into said outlet passage, a diffuser means being disposed in said outlet passage including means to decrease the velocity flow of fluid flowing in said outlet passage and then increasing the velocity of said fluid to reduce flow losses in said fluid, and lubricating means on said casing and connected to said bearing member.

10. A rotary machine comprising a casing including a first and second inlet passage and an outlet passage, both of said inlet passages and said outlet passage being formed within said casing, said ontlet passage being in proximate relation with one of said inlet passages, means forming a driving compartment being disposed in said casing, means forming a pumping chamber being disposed in said casing, said driving compartment and said pumping chamber each having inlet and outlet means, a shaft [rotatably] mounted in said casing and extending [in] *into* said pumping chamber, the portion of said shaft extending into said pumping chamber including means forming a bearing axle, a retaining means formed at the end of the portion of said shaft in said pumping chamber, a bearing member mounted *for rotation* on said bearing axle, a thrust member disposed about said shaft to cooperate with said retaining means to maintain said bearing member in operative position, an impeller means mounted on said bearing member, a blade means disposed in the driving compartment, means for connecting said blade means to said [shaft,] *impeller means so that* said blade means *is* operative to drive said impeller means, said first inlet passage connected to the inlet means of said driving compartment, said second inlet passage connected to the inlet means of said pumping chamber, the outlet means of said pumping chamber and said driving compartment being connected to said outlet passage, a source of working fluid being connected to said first inlet passage to cause said blade means to drive said impeller means to flow fluid into said second inlet passage thru said pumping chamber and into said outlet passage, a diffuser means [to] *in* said outlet passage including means to decrease the velocity flow of fluid flowing in the portion of said outlet passage in proximate relation with one of said inlet passages and then increase the velocity of said fluid whereby flow losses are reduced, and lubricating means on said casing and connected to said bearing member.

11. The rotary machine claimed in claim 9 wherein the blade is formed on the impeller means.

12. The rotary machine claimed in claim 10 wherein the blade means is formed on the impeller means.

13. A rotary machine comprising a casing including a first and second inlet passage and an outlet passage, both of said inlet passages and said outlet passage being formed within said casing, means forming a pumping chamber being disposed in said casing, means forming a driving compartment being disposed in said casing, a shaft [rotatably] mounted in said casing and extending into said pumping chamber, the portion of said shaft extending into said pumping chamber including means forming a bearing axle, a retaining means formed at the end of the portion of said shaft in said pumping chamber, a bearing member mounted *for rotation* on said bearing axle, a thrust member disposed about said shaft to cooperate with said retaining means to maintain said bearing member in operative position, an impeller means mounted on said bearing member, a blade means disposed in said driving compartment, means for connecting said blade means to said [shaft,] *impeller means so that* said blade means *is* operative to drive said impeller means, said first inlet passage connected to said driving compartment, said second inlet passage connected to said pumping chamber, both said pumping chamber and said driving compartment being connected to said outlet passage, a source of working fluid being connected to said first inlet passage to cause said blade means to drive said impeller means to flow fluid into said second inlet thru said pumping chamber and into said outlet passage in one direction of flow, and fluid from said driving compartment being discharged to said outlet passage in another direction of flow, means in said outlet passage to blend the fluid being flowed thereto from said pumping chamber and said driving compartment into substantially one direction of flow, and lubricating means on said casing and connected to said bearing member thru said shaft.

14. A rotary machine comprising a casing including a first and second inlet passage and an outlet passage, both of said inlet passages and said outlet passage being formed within said casing, said outlet passage being in proximate relation with one of said inlet passages, means forming a driving compartment being disposed in said casing, means forming a pumping chamber being disposed in said casing, said driving compartment and said pumping chamber each having inlet and outlet means, a shaft [rotatably] mounted in said casing and extending into said pumping chamber, the portion of said shaft extending into said pumping chamber including means forming a bearing axle, a retaining means formed at the end of the portion of said shaft in said pumping chamber, a bearing member mounted *for rotation* on said bearing axle, a thrust member disposed about said shaft to cooperate with said retaining means to maintain said bearing member in operative position, an impeller means mounted on said bearing member, a blade means disposed in the driving compartment, means for connecting said blade means to said [shaft,] *impeller means so that* said blade means *is* operative to drive said impeller means, said first inlet passage connected to the inlet means of said driving compartment, said second inlet passage connected to the inlet means of said pumping chamber, the outlet means of said pumping chamber and said driving compartment being connected to said outlet passage, a source of working fluid being connected to said first inlet passage to cause said blade means to drive said impeller means to flow fluid into said second inlet thru said pumping chamber and then into said outlet passage in one direction of flow and fluid from said driving compartment being discharged to said outlet passage in another direction of flow, means in said outlet passage to blend the fluid being flowed thereto from said pumping chamber and said driving compartment into substantially one direction of flow, and lubricating means on said casing and connected to said bearing member thru said shaft.

15. The rotary machine claimed in claim 13 wherein the blade means is [connected to] *carried by* the impeller means.

16. The rotary machine claimed in claim 14 wherein the blade means is [connected to] *carried by* the impeller means.

17. A rotary machine comprising a casing including a first and second inlet passage and an outlet passage, both of said inlet passages and said outlet passage being formed within said casing, means forming a pumping chamber being disposed in said casing, means forming a driving compartment being disposed in said casing a shaft [rotatably] mounted in said casing and extending into said pumping chamber, the portion of said shaft extending into said pumping chamber including means forming a bearing axle, a retaining means formed at the end of the portion of said shaft disposed in said pumping chamber, a bearing member mounted *for rotation* on said bearing axle, a thrust member disposed about said shaft to cooperate with said retaining means to maintain said bearing member in operative position, an impeller means mounted on said bearing member, a blade means disposed in said driving compartment, means for connecting said blade means to said [shaft,] *impeller means so that* said blade means *is* operative to drive said impeller means, said first inlet passage connected to said driving compartment, said second inlet passage connected to said pumping chamber, both said pumping chamber and said driving compartment being connected to said ontlet passage, a source of working fluid being connected to said first inlet passage to cause said blade means to drive said impeller means to flow fluid into said second inlet thru said pumping chamber and into said outlet passage in one direction of flow, and fluid from said driving compartment being discharged to said outlet passage in another direction of flow, means in said outlet passage to blend the fluid being flowed thereto from said pumping chamber and said driving compartment into substantially one direction of flow and a diffuser means in said outlet passage including means to decrease the velocity flow of fluid flowing in said outlet passage and then increasing the velocity of said fluid to reduce flow losses in said fluid.

18. A rotary machine comprising a casing including a first and second inlet passage and an outlet passage, both of said inlet passages and said outlet passage being formed within said casing, said outlet passage being in proximate relation with one of said inlet passages, means forming a driving compartment being disposed in said casing, means forming a pumping chamber being disposed in said casing, said driving compartment and said pumping chamber each having inlet and outlet means, a shaft [rotatably] mounted in said casing and extending into said pumping chamber, the portion of said shaft extending into said pumping chamber including means forming a bearing axle, a retaining means formed at the end of the portion of said shaft in said pumping chamber, a bearing member mounted *for rotation* on said bearing axle, a thrust member disposed about said shaft to cooperate with said retaining means to maintain said bearing member in operative position, an impeller means mounted on said bearing member, a blade means disposed in the driving compartment, means for connecting said blade means to said [shaft,] *impeller means so that* said blade means *is* operative to drive said impeller means, said first inlet passage connected the inlet means of said driving compartment, said second inlet passage connected to the inlet means of pumping chamber, the outlet means of said pumping chamber and said driving compartment being connected to said outlet passage, a source of working fluid being connected to said first inlet passage to cause said blade means to drive said impeller means to flow fluid into said second inlet thru said pumping chamber and then into said outlet passage in one direction of flow and fluid from said driving compartment being discharged to said outlet passage in another direction of flow, means in said outlet passage to blend the fluid being flowed thereto from said pumping chamber and said driving compartment into substantially one direction of flow, and a diffuser means in said outlet passage including means to decrease the velocity flow of fluid flowing in said outlet passage and then increasing the velocity of said fluid to reduce flow losses in said fluid.

19. The rotary machine claimed in claim 18 wherein the blade means is [connected to] *carried by* the impeller means.

20. The rotary machine claimed in claim 19 wherein the blade means is [connected to] *carried by* the impeller means.

21. A rotary machine comprising a casing including a first and second inlet passage and an outlet passage, both of said inlet passages and said outlet passage being formed within said casing, means forming a pumping chamber being disposed in said casing, means forming a driving compartment being formed in said casing, a shaft [rotatably] mounted in said casing and extending into said pumping chamber, the portion of said shaft extending into said pumping chamber including means forming a bearing axle, a bearing member mounted *for rotation* on said bearing axle, retaining means to maintain said bearing member in operative position, an impeller means mounted on said bearing member, a blade means disposed in said driving compartment, means for connecting said blade means to said [shaft,] *impeller means so that* said blade means *is* operative to drive said impeller means, said first inlet passage connected to said driving compartment, said second inlet passage connected to said pumping chamber, both of said pumping chamber and said driving compartment being connected to said outlet passage, a source of working fluid being connected to said first inlet to cause said blade means to drive said impeller to flow fluid into said second inlet thru said pumping chamber and into said outlet passage, a diffuser means being disposed in said outlet passage including means to decrease the velocity flow of fluid flowing in said outlet passage and then increasing the velocity of said fluid to reduce flow losses in said fluid and lubricating means on said casing and connected to said bearing member.

22. The rotary machine claimed in claim 21 wherein the lubricating means is mounted within said casing.

23. The rotary machine claimed in claim 22 including a cover member mounted in the central cavity of the casing, and forming another cavity, a passage means thru said shaft and connected to said bearing member, a conduit means mounted within said other cavity and connected to said passage means, an opening in said cover member and communicating said other cavity with said first inlet, a passage means in said bearing member, a passage means in said cover member interconnecting said passage means in said bearing member to said other cavity.

24. The rotary machin claimed in claim 21 wherein said retaining means on said shaft to maintain said bearing member in operative position comprises upper and lower ball bearing members, a retaining means at the end of of said bearing members, a retaining means at the end of said shaft for said lower ball bearing member and a thrust member on said shaft to maintain the upper ball bearing member in operative position.

25. The rotary machine claimed in claim 24 including a passage means thru said shaft and in said thrust member communicating the lubricating means with said bearing member.

26. The rotary machine claimed in claim [21 wherein] *1, further comprising a bearing member mounted in said casing, and wherein said impeller mounting means comprises a shaft mounted for rotation in said bearing member,* said bearing member comprises internal faces forming a bearing surface for said shaft, and the means for retaining said [bearing member] *shaft* in operative position comprise a nut threaded to one end of said shaft and a head at the other end of said shaft.

27. The rotary machine claimed in claim 26 [including] *further comprising lubricating means on said casing, and means connecting said lubricating means with said bearing member, said connecting means comprising* a passage means in said bearing member *and* another passage means communicating said first mentioned passage means with said lubricating means.

References Cited

The following references, cited by the Examiner, are of record in the patented file of this patent or the original patent.

UNITED STATES PATENTS

| | | | |
|---|---|---|---|
| 1,140,828 | 5/1915 | Jackson et al. | 103—87 |
| 1,610,454 | 12/1926 | Lawaczeck | 103—87 |
| 2,726,606 | 12/1955 | Davidson | 103—87 |

ROBERT M. WALKER, *Primary Examiner.*